UNITED STATES PATENT OFFICE.

JULES VILLE, OF MONTPELLIER, FRANCE.

RED DYE AND PROCESS OF MAKING SAME.

SPECIFICATION forming part of Letters Patent No. 701,427, dated June 3, 1902.

Application filed October 3, 1901. Serial No. 77,460. (Specimens.)

*To all whom it may concern:*

Be it known that I, JULES VILLE, a citizen of the Republic of France, residing at Montpellier, France, have invented a certain new and useful Red Dye and Process of Making Same, of which the following is a specification.

According to this invention dialkylmetaminolphenol in acetic acid is treated with heat in the presence of an oxidizing agent, such as sodium arseniate, and of sodium acetate with chloral for the purpose of obtaining a new red coloring substance of great technical value, the process taking place according to the following equation:

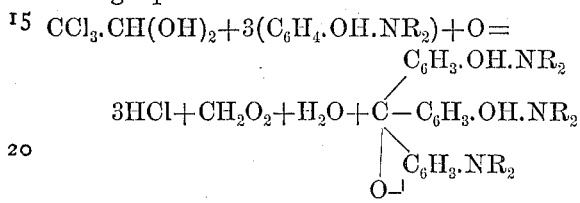

As one way of carrying out my invention I heat to a temperature of 100° centigrade and keep at that temperature for four hours while agitating diethylmetaminophenol, one part; crystallized disodium arseniate, 1.5 parts; crystallized sodium acetate, 1.5 parts; glacial acetic acid, three parts; crystallized chloral, 0.5 part.

The product of the reaction, which is of a vivid red color, is after it has been allowed to cool neutralized with soda. The precipitate thus obtained is washed in a saturated solution of salt, dried, and treated at the boiling-point with about thirty parts of water. The liquor filtered while hot will precipitate as it cools crystals, which are allowed to accumulate for forty-eight hours before they are collected. The product thus obtained appears as a mass of beautiful bluish iridescent crystals very slightly soluble in cold water, but more soluble in hot water, imparting to it a beautiful cherry-red color, with orange-yellow fluorescence. This substance is easily dissolved in alcohol, but is insoluble either in ether or in benzene. Concentrated hydrochloric and sulfuric acids dissolve this product, giving orange-red color, which on diluting the solution with water changes into red with a tint of violet and forming after a few moments a precipitate of green needle crystals.

The hydrochlorate, especially when collected and left to dry and finally dried at a temperature of 100° centigrade, appears as a mass of crystals with cantharadin-green reflection. This salt is very soluble in water and alcohol, to which it imparts a beautiful cherry-red color with orange-yellow fluorescence.

The solutions are decolorized by treating them with some reducing agent, (zinc-powder and ammonia,) while the color is restored again by means of an oxidant or by simple exposure to the air. The color dyes wool or silk when used in a neutral (or, better, a slightly-acetic) bath, imparting a beautiful color of more or less dark shades. The product of my invention may be obtained with dimethylmetaminophenol by proceeding as in the preparation of the ethyl derivative. The colors imparted to tanned goods by this product are less bright and bluer than those imparted by the ethyl derivation. The base presents itself in the shape of needle crystals of an iridescent blue color and is very soluble in hot water. Its chlorhydrate is much less soluble than that of the ethyl derivative.

The shades obtained with this dye are less beautiful and rich than those obtained by means of the ethyl derivative.

What I claim as my invention, and desire to secure by Letters Patent, is—

1. The herein-described process of producing a coloring-matter which dyes red, said process consisting in heating dialkylmetaminophenol in acetic liquor with an oxidizing agent and chloral.

2. The herein-described process of producing a coloring-matter which dyes red, said process consisting in heating diethylmetaminophenol in acetic liquor with an oxidizing agent and chloral.

3. A new coloring-matter obtained by heating dialkylmetaminophenol in acetic liquor with an oxidizing agent, sodium acetate and chloral, appearing in the form of bluish iridescent crystals slightly soluble in cold water but more soluble in hot water with orange-yellow fluorescence and dyeing red.

In testimony whereof I have signed my name to this specification in the presence of two subscribing witnesses.

JULES VILLE.

Witnesses:
ARTRE CHARLES,
RENE ALRIC.